A. H. GROSZ.
WHEEL STRUCTURE.
APPLICATION FILED MAR. 27, 1916.
1,191,175.
Patented July 18, 1916.
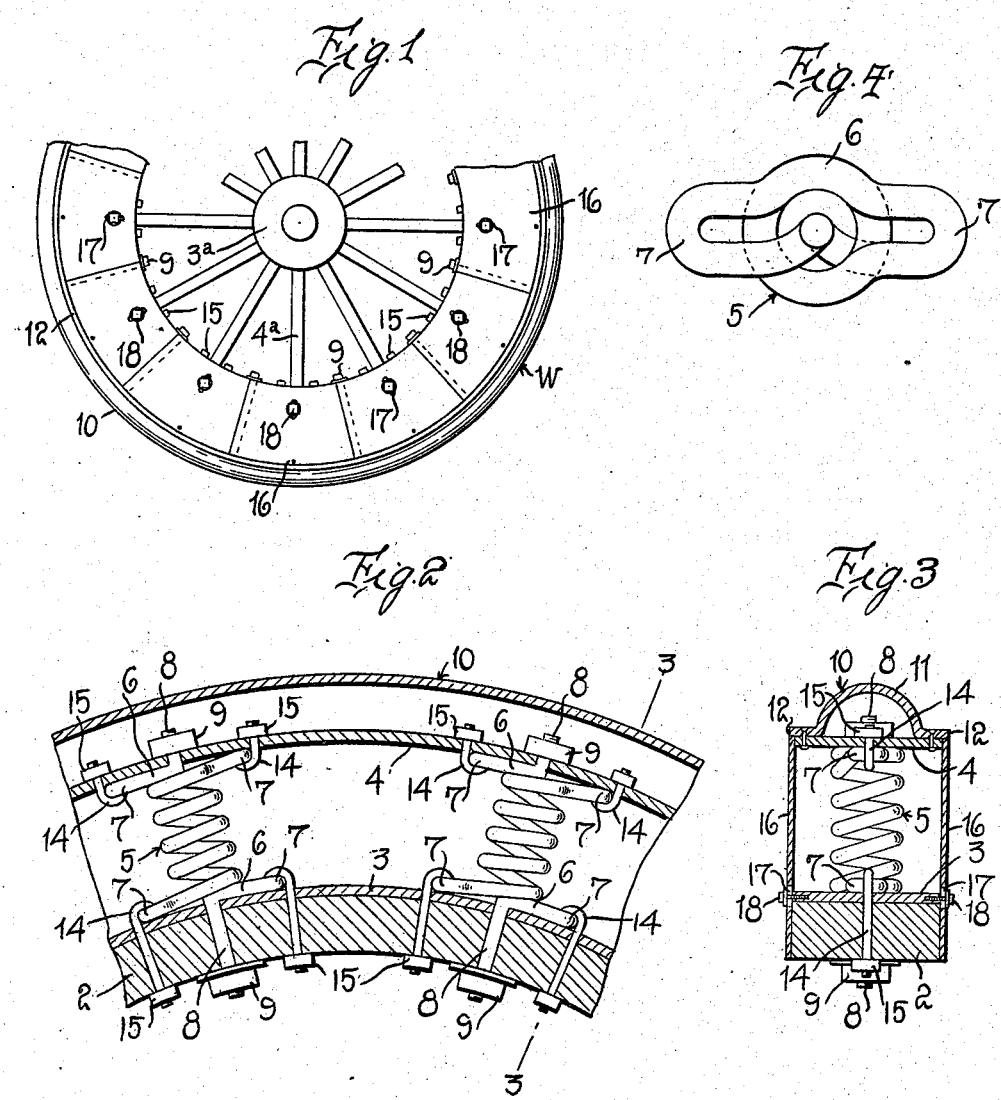
Inventor
ADAM H. GROSZ
By Watson E. Coleman
Attorney

UNITED STATES PATENT OFFICE.

ADAM HENRY GROSZ, OF NEW ORLEANS, LOUISIANA, ASSIGNOR OF ONE-HALF TO BENNETT W. SEIDEL, OF NEW ORLEANS, LOUISIANA.

WHEEL STRUCTURE.

1,191,175.　　　　　Specification of Letters Patent.　　Patented July 18, 1916.

Original application filed December 8, 1915, Serial No. 65,741. Divided and this application filed March 27, 1916. Serial No. 87,077.

*To all whom it may concern:*

Be it known that I, ADAM H. GROSZ, a citizen of the United States, residing at New Orleans, in the parish of Orleans and State of Louisiana, have invented certain new and useful Improvements in Wheel Structures, of which the following is a specification, reference being had to the accompanying drawings.

This invention relates to certain improvements in wheel structures and it is an object of the invention to provide a novel and improved device wherein a resiliently supported tread member is provided whereby the shocks or vibrations incident to travel are substantially entirely absorbed, the structure herein described and illustrated being a division of my co-pending application, Serial No. 65,741, filed December 8, 1915, and allowed February 19, 1916, for improvements in vehicle brakes.

The invention consists in the details of construction and in the combination and arrangement of the several parts of my improved wheel structure whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a fragmentary view in side elevation of a wheel structure arranged in accordance with an embodiment of my invention; Fig. 2 is a fragmentary enlarged sectional view illustrating certain details of the wheel structure as herein embodied; Fig. 3 is a transverse sectional view taken on the line 3—3 of Fig. 2; and Fig. 4 is a view in top plan of one of the expansible members or springs as herein included.

As disclosed in the accompanying drawings, W denotes my improved wheel as an entirety and as herein embodied, said structure comprises a felly 2 operatively engaged with the hub 3ª through the medium of the spokes 4ª in a conventional manner. Disposed around the felly 2 and suitably secured thereto is the rim 3 and concentrically disposed relative to the rim 3 and in predetermined spaced relation thereto is a second rim 4 said rims 3 and 4 having interposed therebetween the expansible members 5 herein disclosed as coiled springs.

As herein set forth, each of the members 5 has its end convolution or fake 6 provided with the oppositely disposed extension loops 7 of a width less than the diameter of the end convolution or fake and affording an increased bearing or contacting surface for the members 5 as is believed to be particularly illustrated in the accompanying drawings, and the opposite end portions of the spring are longitudinally extended as at 8, said portions 8 being at substantially the axial center of the member 5 and extended through the rim 3 and felly 2 and through the outer rim 4 and the free end portions of the extensions 8 have operatively engaged therewith the clamping nuts 9 whereby it will be perceived that the member 5 is effectively maintained in applied position.

It will be understood that the members 5 are of such tension as to maintain the rims 3 and 4 separated but will compensate for the weight imposed thereon to substantially absorb all undue vibration or shock. Secured to the outer surface of the rim 4 is the annular tread member 10 having its intermediate portion substantially semi-circular in cross section, as indicated at 11, and affording the annular marginal flanges 12 whereby the tread may be readily and conveniently secured to the rim 4. The members 5 are further maintained in applied position by the clip bolts 14 disposed through the rims 3 and 4 and overlying or bridging the outer extremities of the loops 7, and coacting with the clip bolts 14 in a conventional manner are the clamping nuts 15.

In order to protect the interposed members 5 I provide the rim 4 at opposite sides with the inwardly disposed shield sections 16 of sufficient width as to overlie the opposite sides of the felly 2. It is also to be recognized that the form of the tread member 10 in cross section effectively serves to prevent skidding, and also serves to inclose the clamping nuts 9 and 15, whereby the same are effectively held against accidental displacement.

From the foregoing description it is thought to be obvious that a wheel structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A wheel structure including a felly, a rim concentrically disposed relative to the felly and in predetermined spaced relation thereto, a plurality of expansible members interposed between the felly and the rim, each of said members comprising a coil spring having each of its end convolutions provided with oppositely disposed loops of a width less than the width of the end convolutions and affording an increased bearing or contacting surface, the opposite extremities of the spring being longitudinally extended and positioned at substantially the axial center of the spring, said extensions being disposed through the rim and felly, and clamping members coacting with said loops and the rim and felly for anchoring the spring in applied position.

In testimony whereof I hereunto affix my signature in the presence of two witnesses.

ADAM HENRY GROSZ.

Witnesses:
BENNET W. SEIDEL,
PETER P. FERREN.

Copies of this patent may be obtained for five cents each, by addressing the "Commissioner of Patents, Washington, D. C."